United States Patent [19]

Roslund et al.

[11] Patent Number: 4,928,219
[45] Date of Patent: May 22, 1990

[54] ADAPTABLE CURRENT REGULATING SYSTEM

[75] Inventors: Charles J. Roslund, Monroeville; Bruce M. Cook, Plum Boro, both of Pa.

[73] Assignee: Westinghouse Electric Corp., Pittsburgh, Pa.

[21] Appl. No.: 373,077

[22] Filed: Jun. 29, 1989

[51] Int. Cl.$^5$ .............................................. H02M 1/18
[52] U.S. Cl. ........................................ 363/54; 363/87; 363/129; 361/85; 361/87; 361/93
[58] Field of Search .................... 363/50, 52–54, 363/84, 85, 87, 128, 129; 361/62–65, 66, 85, 86, 87, 93

[56] References Cited

U.S. PATENT DOCUMENTS

| | | | |
|---|---|---|---|
| 4,490,780 | 12/1984 | Nondahl | 363/129 |
| 4,586,121 | 4/1986 | Gilliam | 363/87 |
| 4,628,460 | 12/1986 | Frederich | 363/87 |
| 4,633,241 | 12/1986 | Casteel et al. | 363/54 |
| 4,670,831 | 6/1987 | Fauvet et al. | 363/87 |
| 4,717,528 | 1/1988 | Meyer et al. | |

Primary Examiner—Peter S. Wong
Attorney, Agent, or Firm—B. R. Nath

[57] ABSTRACT

An adaptable current regulating system provides a regulated current in accordance with both the actual characteristics of a system under control and the actual measured period of an AC supply. The system constantly monitors its status, and provides a master controller with the status of the system, and is programmed to provide control in accordance with information received from the master controller.

4 Claims, 4 Drawing Sheets

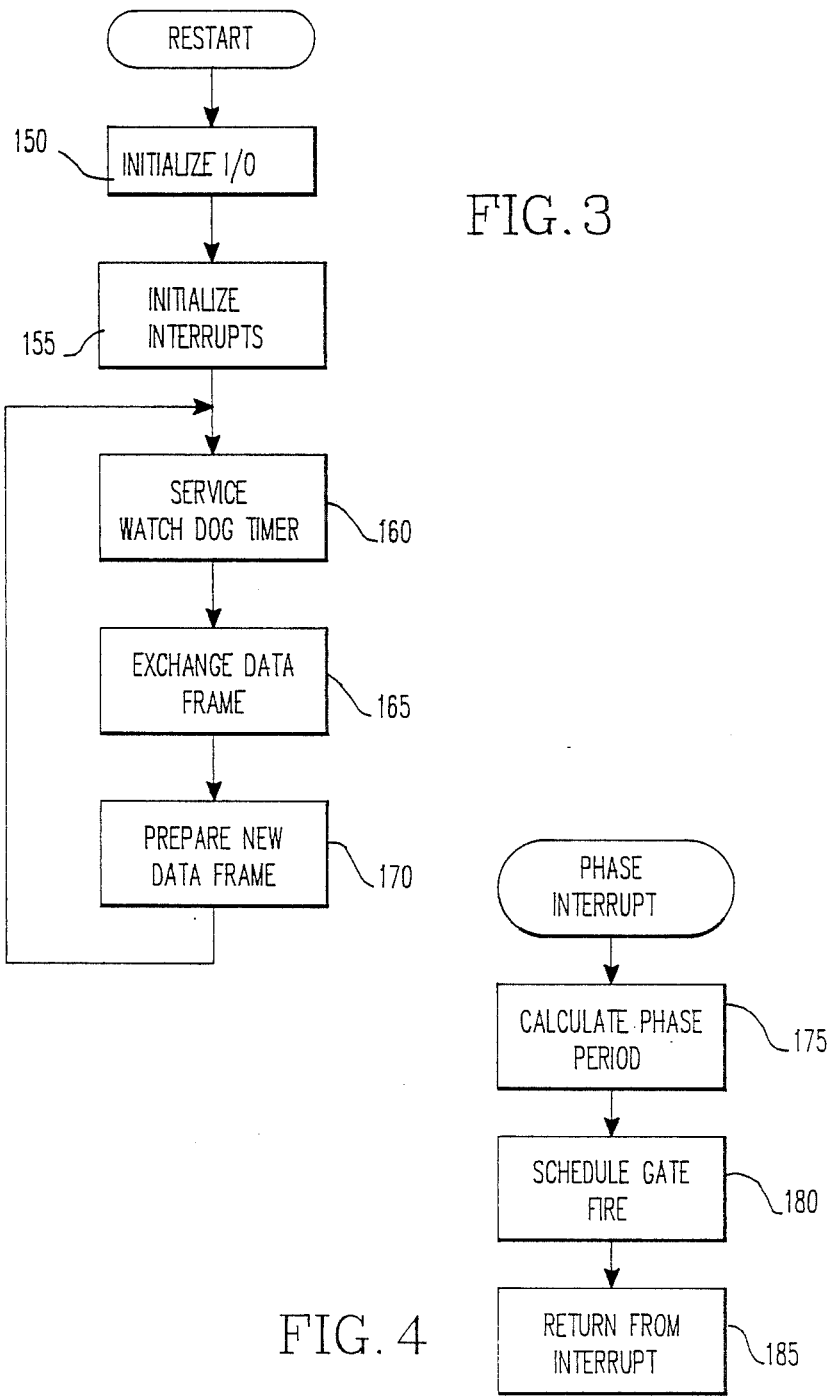

ADAPTABLE CURRENT REGULATING SYSTEM

BACKGROUND OF THE INVENTION

It is frequently desirable to provide regulated DC current to a drive control element such as an electromagnetic coil or a motor. Typically, control of the regulated current depends primarily or the characteristics of the drive control element. These characteristics vary from system to system and are not normally known when the control system is designed and constructed. A system designer is therefore forced to design using typical, rather than actual characteristics of the drive control element.

While such control is adequate, in some systems, it would be beneficial to provide a regulated current based upon the actual characteristics of the drive control element. An example of such a system is a nuclear reactor rod control system. In a rod control system, the position of the rods is typically controlled by electromagnets. The power for these electro-magnets is derived from three phase AC power. To accurately regulate the current driving the electro-magnets and thus the control rod position, it is desirable to monitor the phase periods of the AC power. Monitoring the AC power phase period, however, does not provide control adapted to the characteristics of the drive control system.

SUMMARY OF THE INVENTION

It is an object of the present invention to provide an accurate adaptable current regulating system.

It is another object of the present invention to provide a current regulating system that regulates current in accordance with actual characteristics of a system under control.

It is a further object of the present invention to provide a current regulating system that regulates current in accordance with a measured period of a supply voltage.

It is still another object of the present invention to provide a current regulating system that is capable of providing information regarding the status of the system under control to a master controller.

To achieve the above and other objects, the present invention provides an adaptable current regulating system that has a status, is connectable to receive a supply voltage and provides a controlled current to a drive control element in accordance with information received from a master controller. The system comprises a communication means for receiving the information from the master controller, for receiving status data and for transmitting the status data to the master controller; a control means for monitoring the status of the system and providing the status data, for monitoring the received supply voltage, and for generating at least one drive signal that varies in accordance with at least some of the information and the monitored supply voltage; and a fault means for monitoring the at least one drive signal and the received supply voltage, and for generating at least some of the status data in response to the monitoring of the at least one drive signal and the received supply voltage.

BRIEF DESCRIPTION OF THE DRAWINGS

FIG. 3 illustrates the overall logic flow of a current controller main program in the FIG. 1 system; and FIGS. 4 and 5 illustrates the overall logic flow for the current controller interrupt driven processing in the FIG. 1 system.

DESCRIPTION OF THE PREFERRED EMBODIMENT

Figure 1:
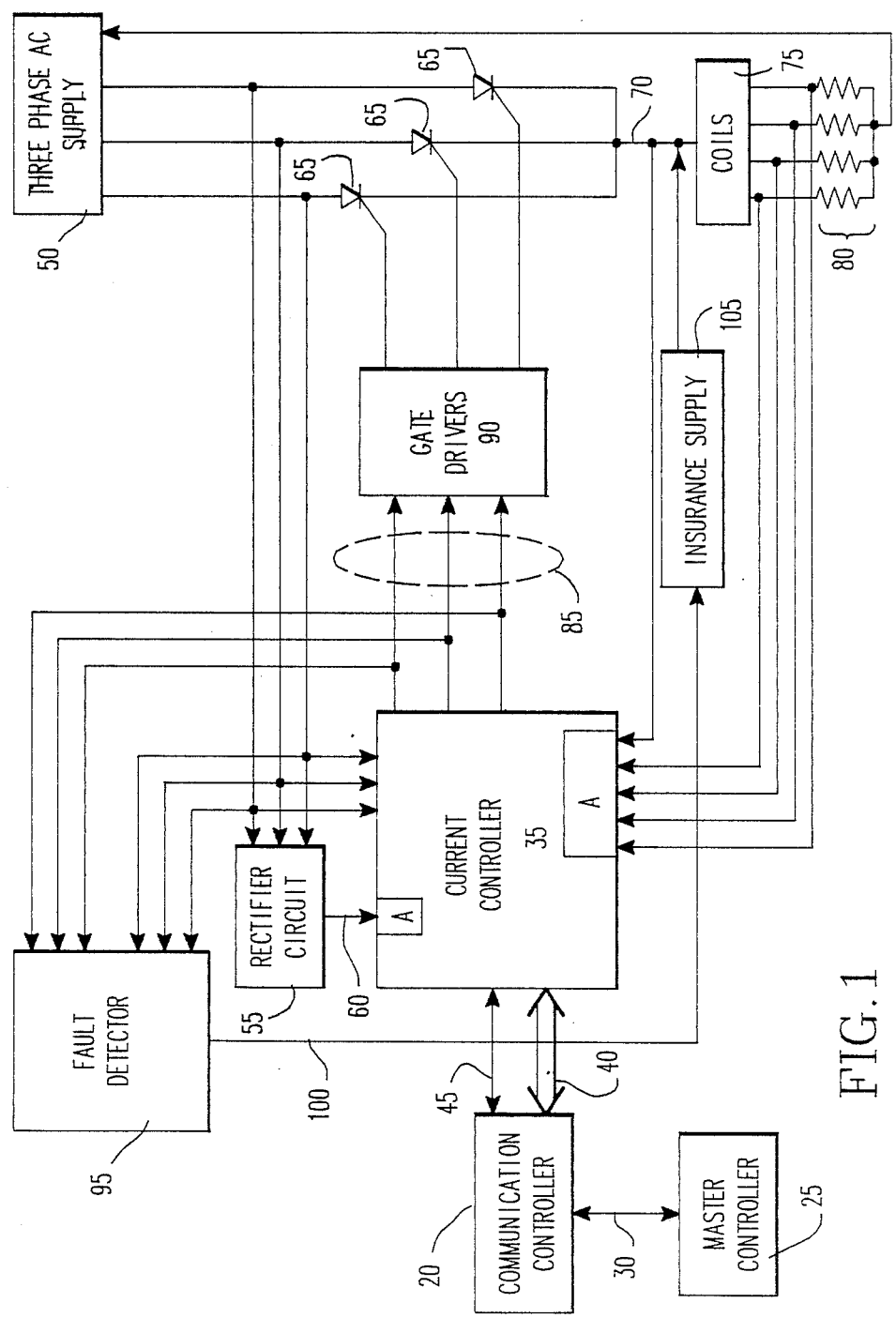
FIG. 1 is a block diagram of a control rod system embodying the present invention.

FIG. 1 is a block diagram of a control rod system embodying the present invention. A communication controller 20 receives information from a master controller 25 over a bi-directional serial I/O bus 30. The communication controller 20 provides this information to a current controller 35 over a bi-directional bus 40 using hand shaking signal lines 45. The communication controller also receives status data from the current controller 35 and transmits this status data to the master controller 25 over the bi-directional serial I/O bus 30. The communication controller 20 can comprise, for example, a 8744 microcontroller manufactured by Intel Corporation. The communication controller 20 functions as a communication means for receiving information from the master controller 25, for receiving status data from the current controller 35 and for transmitting the status data to the master controller 25.

The current controller 35 monitors the AC supply voltage provided by a three phase AC supply 50. The current controller 35, for example, measures the phase period of each of the three phases provided by the three phase AC supply 50.

A rectifier circuit 55 rectifies the three phase AC voltage and provides a DC line voltage on signal line 60. This signal can comprise a portion of the status data and indicates the magnitude of the available DC line voltage. The rectifier circuit 55 can comprise any well known rectifier circuit, and is not critical to the present invention. A set of thyristors 65 rectify the three phase AC supply voltage and provide a DC coil voltage on line 70. The thyristors function as a switching means to vary DC coil voltage. The DC coil voltage is applied to a drive control element 75 which can comprise, for example, an electro-magnet or a motor. In the case of a nuclear rod control system, the drive control element comprises a collection of electro-magnets respectively associated with corresponding ones of the control rods. The current through the respective electro-magnetic coils is sensed by way of resistors 80; and the respective DC coil currents are applied to the current controller 35. The current controller 35 also receives the DC coil voltage that appears on DC coil current line 70 which, together with the DC coil currents, can comprise a portion of the status data.

Based upon the information received from the communication controller 20, the phase periods, the DC line voltage, the DC coil voltage and the DC coil currents, the current controller 35 provides a set of drive signals or gate fire outputs on drive signal lines 85. Gate drivers 90 drive the gates of the thyristors 65 in accordance with the drive signals provided by the current controller 35. The current controller 35 functions as a control means to monitor the status of the system and to provide status data representing the system status to the master controller 25 via the communication controller 20; and to monitor the supply voltage provided by three phase AC supply 50 and to generate drive signals that vary in accordance with information received from communication controller 20 and the monitored supply voltage (e.g., the phase period). The current controller 35 can comprise, for example, an 8097 manufactured by Intel Corporation.

In FIG. 1, a fault detector 95 monitors the drive signals provided on drive signal lines 85 by the current controller 35. The fault detector 95 also monitors the supply voltage provided by the three phase AC supply 50. The fault detector 95 functions to ensure that within each phase of the AC supply voltage, there is a drive signal provided on the associate one of the drive signal lines 85. If no drive signal appears within the associated phase period, then the fault detector 95 outputs a signal on current fault signal line 100 that indicates that there is a fault in the system.

The fault detector 95 can comprise a microcomputer or hard wired logic. The inventors of the subject application have used a programmable logic array to implement the functions of the fault detector 95. The logic of the fault detector 95 is straight forward and need only detect the absence of a drive signal during the time that the corresponding phase of the voltage provided by the three phase AC supply 50 is positive. If there is no drive signal, then the corresponding thyristor 65 is not being turned on, and a fault may exist in the current controller 35. In response to detecting a current fault signal on line 100, the fault detector 95 can sound an alarm and/or perform error correction or diagnostic functions. For example, in FIG. 1, the fault detector 95 can activate an insurance supply 105 in response to an error detection as described above. The insurance supply 105 is connected in parallel with the three phase AC supply 50, and ensures that the drive control element 75 receives current. In a nuclear rod control system, the insurance current ensures that the control rods are not dropped.

The fault detector 95 functions as a fault means for monitoring the drive signals on drive signal lines 85 and the supply voltage provided by the three phase AC supply 50; and for generating status data including a current fault signal on current fault signal line 100 in response to detecting the absence of a drive signal during the positive portion of the corresponding phase of the three phase AC supply voltage. The insurance supply 105 functions to receive an insurance supply voltage which can be a multi-phase supply voltage, and to provide a voltage to the drive control element 75 in response to the current fault signal provided by the fault detector 95. The voltage provided by the insurance supply 105 can be a DC current corresponding to the insurance supply voltage or a rectified version of the received insurance supply voltage. In the case of insurance supply 105 providing a rectified version of the insurance supply voltage, the fault detector 95 can provide a gate control signal on control line 100. The gate control signal controls a thyristor within the insurance supply 105 in a manner similar to that which the current controller 35 drives the thyristors 65. While the insurance supply 105 is DC/rectified AC, only a single gate control signal 100 is needed to turn on a thyristor that switches a DC output from the insurance supply 105.

Figure 2:
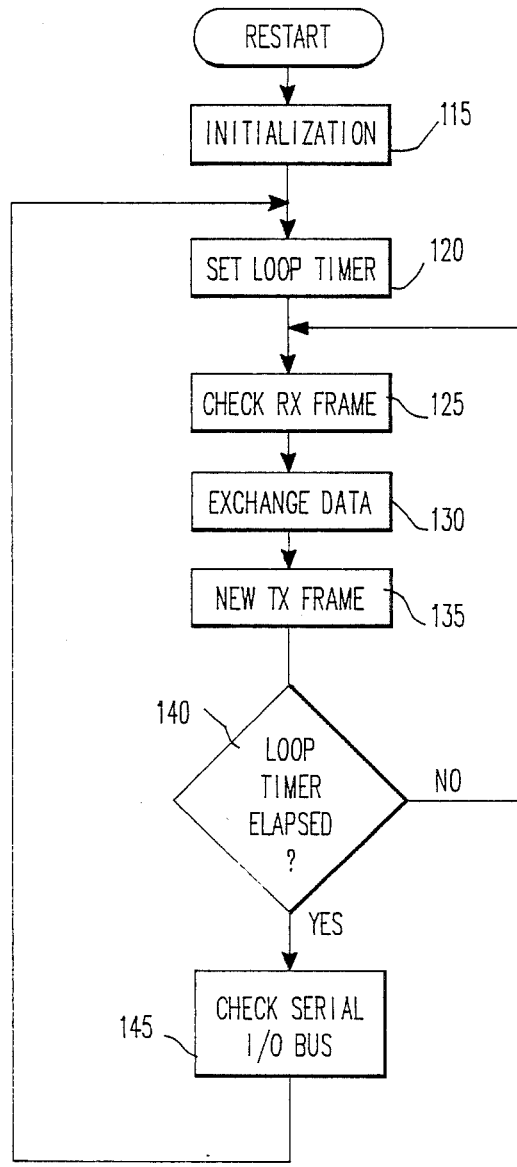
FIG. 2 illustrates the overall logic flow of a communication controller in the FIG. 1 system.

FIG. 2 illustrates the overall logic flow of the communication controller 20. While starting up the system, the communication controller 20 performs an initialization step 115. Essentially, the initialization step 115 comprises initializing the I/O port pins of the Intel 8744. After performing the initialization step 115, the communication controller 20 sets a loop timer in step 120. The loop timer ensures that the main loop processing (e.g., step 135) is performed at fixed intervals.

The communication controller next executes a step 125 to examiner the information received from the master controller 25 over the bi-directional serial I/O bus 30. In a preferred embodiment of the present invention, the communication controller 20 receives information from the master controller 25 in eighteen (18) byte frames. The first five bytes are required by the Intel BITBUS communication protocol. This protocol is well known to those skilled in the art and is described in, for example, Intel iSBX 344 Intelligent BitBus Inter-Face Board User's Guide (Order No. 148099-001), incorporated by reference. The remaining bytes in the information are as follows.

The sixth byte identifies the particular communication controller with which the master controller 25 is communicating. This byte is used if other communication controllers 20 or other elements are attached to the bi-directional serial I/O bus 30. When used, the communication controller or other device attached to the serial I/O bus 30 will check this byte to determine if it matches the address or identifying code of the device.

The seventh byte identifies the type of information being transmitted to the communication controller 20. For example, the seventh byte identities whether the information is to be passed to the current controller 35 or to be used by the communication controller 20. If the information is to be passed to the current controller 35, the information would, for example, provide initial values for parameters used by the current controller 35, and initialize a watch dog timer (not shown). The parameters would include the proportional, integral, derivative gains for a current control algorithm, a default thyristor firing phase angle, default current set point and current deviation error limits (e.g., ripple and absolute error amount). In addition, information can be passed to the current controller 35 would include a command to perform either set point or current profile control. The information transmitted to the communication controller 20 from the master controller 25 can also request that the communication controller 20 transmit status data including, for example, the current DC coil currents, the DC coil voltage, the DC line voltage and current error values such as absolute current error amount being employed by the current controller 35 control algorithm.

In a preferred embodiment of the preferred embodiment, the eighth and ninth bytes of the information transmitted by the master controller 25 are for the current controller 35 application. For example, the eighth and ninth bytes define a particular control rod pattern and the number of rods that move at once.

The tenth through fifteenth bytes define the data for current profile control. For example, the tenth and eleventh bytes can define two separate levels of current and the twelfth through fifteenth bytes define times at which the current should be changed to the identified levels.

The sixteenth and seventeenth bytes in a preferred embodiment of the present invention are spare data bytes and can be used for any application specific processing. The last byte transmitted by the master controller 25 is a check sum of the data present in the sixth through seventeenth bytes.

After checking the information received from the master controller 25 in step 125, and performing the processing indicated by the received information, the communication controller 20 executes an exchange data step 130. The exchange data step 130 manages the transfer of information between the communication controller 20 and the current controller 35 over the bi-directional bus 40. In a preferred embodiment this exchange uses the hand shaking signals on hand shaking signal lines 45; and 8 bit parallel information is exchanged. Other data transfer schemes can be used in accordance with the particular design of an embodiment of the present invention.

In a preferred embodiment, one 8 bit port of the Intel 8744 is dedicated to outputting data to the current controller 35, and another 8 bit port of the Intel 8744 is dedicated to receiving information from the current controller 35. The manner in which hand shaking communication is performed is known to those skilled in the art and is therefore not discussed here. To ensure that the communication controller 20 and the current controller 35 recognize the beginning and end of information exchanged therebetween, a series of zero data bits are transmitted after each exchange so as to allow the communication controller 20 and current controller 35 to recognize framing of the information.

After completing and exchange of data, the communication controller 20 performs a transmission step 105. As denoted in FIG. 2, the new TX Frame step 135 transmits data from the communication controller 20 to the master controller 25 over the bi-directional serial I/O bus 30. As with the information received from the master controller 25, the data transmitted comprises eighteen (18) bytes. The first six bytes are used by the Intel BITBUS communication protocol described above. The seventh byte identifies the device (e.g., communication controller) from which the information is being transmitted. The next byte comprises status data indicating the status of the system. For example, one bit of the status data byte indicates that the current controller needs to be initialized with parameters as discussed above. The remaining bits of the seventh byte can indicate if the absolute error current exceeds its permitted value, the received command could not be executed by the current controller 35, excess ripple exists in the DC coil voltage, and other status/alarm states monitored.

The eighth byte identifies the status of the current controller and indicates whether the current controller 35 is in the process of or has executed a current profile control procedure. For example, this byte indicates if the current controller 35 has brought the current to a first level for a first time followed by changing the current to a second level for a second time period. In addition, this byte indicates if there was a check sum error in the information received from the master controller 25.

The ninth through eleventh bytes include status information such as the magnitudes of the specific coil currents, the temperature of the cabinet in which the current controller 35 is housed, and an indication of the supply voltage magnitude provided by the three phase AC supply 50.

After transmitting this information to the master controller 25, the communication controller 20 then determines if a loop timer has elapsed in loop 140. If not, then steps 125, 130 and 135 are repeated. Otherwise, a check of the serial I/O bus, step 145 is performed. Step 145 performs the necessary maintenance and synchronization functions for the serial I/O bus, such as described in the above referenced Intel iSBX 344 User's Guide. After completing the processing of step 145, the communication controller 20 resets the loop timer in step 120 and repeats the processing as described above.

Figure 5:
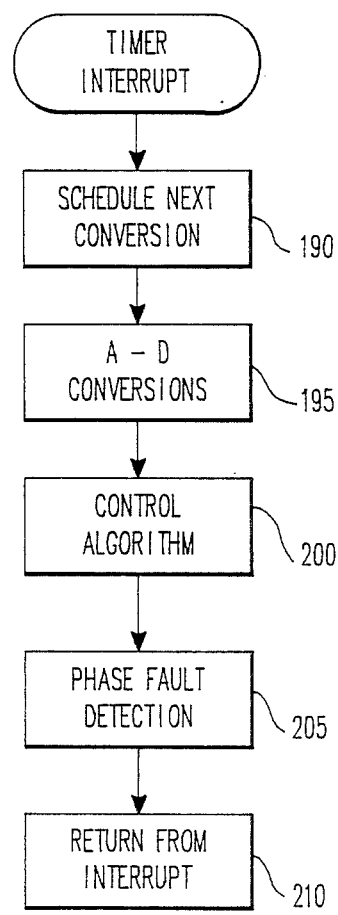

The processing for the current controller 35 comprises a main program which is primarily manages communications between the current controller 35 and the communication controller 20; and interrupt driven programs for controlling the gate drivers 90 and implementing the particular current control algorithm. FIG. 3 illustrates the overall logic flow of the main program, while FIGS. 4 and 5 illustrates the overall logic flow for the interrupt driven processing.

Referring to FIG. 3, on power up, the current controller 35 main program executes an initialization of the I/O pins of the Intel 8097 chip, by executing step 150. For example, the current controller 35 initializes the input and output ports for parallel communications with the communication controller 20 over the bi-directional bus 40. The current controller 35 also initializes the I/O port bits to receive the DC coil currents, DC coil voltage, DC line voltage and the phase cross inputs (on lines 152) from the three phase AC supply 50.

After initializing the I/O ports, the current controller 35 executes an initialization of interrupts in step 155. This initialization includes, for example, initializing internal registers and timer and enabling interrupts. The main program shown in FIG. 3 is interrupted each time one of the phases provided by the three phase AC supply 50 crosses zero from the negative portion of the waveform to the positive portion of the waveform (as detected on lines 152). During each of these interrupts, the phase cross interrupt processing shown in FIG. 4 is performed. In addition, the main program is interrupted periodically when an on chip timer times out. For each timer interrupt, the timer interrupt processing shown in FIG. 5 is performed. During the initialization of interrupts step 155, the on chip timer is initialized and interrupts are enabled. Following step 155, the main program services a watch dog timer (not shown) in step 160. The first time that step 160 is executed, the watch dog timer is initialized and enabled. Each subsequent servicing of the watch dog timer causes the timer to be cleared (e.g., reset). A time out of the watch dog timer causes the communication controller 20 and current controller 35 to be reset.

After servicing (resetting) the watch dog in step 160, the main program executes an exchange data frame step 165. The exchange data frame step 165 manages the receipt of information frames that were received via the bi-directional serial I/O bus 30 by the communication controller 20 and subsequently passed to the current controller 35 over the bi-directional bus 40; and manages the transmission of information (e.g., status data) to the communication controller 20 over bi-directional bus 40 using hand shaking signal lines 45. As outlined above, the current controller 35 receives information including commands and requests. The commands include an instruction to perform a current profile control based on received parameters indicating the desired current levels and times at which these current levels are to be maintained together with the particular coils to be controlled. Alternatively, the current controller 35 can be instructed to maintain a steady current based upon a parameter identifying the desired current level. The master controller 25 can, via communication controller 20, request that the current controller 35 provide status data indicating the status of the system, and the current controller 35 will receive an acknowledgement of an alarm from the master controller 25 once the alarm condition has been serviced by the master controller 25.

In a preferred embodiment, when reporting the status of the system, the current controller 35 identifies if one of the coils 75 is improperly connected or is drawing an excessive current; identifies if a coil is requiring a current for an excessively long period of time or if there is a severe ripple on the sensed DC coil voltage. Additionally, the current controller 35 detects if a particular AC phase is missing as discussed above. Other status data can be detected by the current controller 35 in dependence upon the particular system being controlled.

In the exchange data frame step 165, the current controller 35 uses the hand shaking signal lines 45 to transmit parallel data to the communication controller 20. Transmitting parallel data in accordance with hand shaking signals is well known to those skilled in the art and therefore the details are not provided here. After receiving information from the communication controller 20, the current controller 35 identifies the most recently received information frame as such, and stores this frame for use by the interrupt driven tasks. The current controller 35 also ensures that an information frame including status data is maintained for transmission to the controller 20 upon request. The current controller 35 prepares the new status data frame in step 170. The status data includes, in addition to the information discussed with respect to the communication controller 20, an AC phase timing error calculated by the interrupt driven phase cross interrupt processing (FIG. 4). The AC phase timing error signal indicates that one of the three phases provided by the Three Phase AC supply 50 may be missing.

FIG. 4 illustrates the overall logic flow of the phase cross interrupt processing. Within the interrupt hierarchy of the Intel 8097, the phase cross interrupt processing has a higher priority than the timer interrupt (FIG. 5). Upon the occurrence of a phase cross interrupt, the phase period is calculated in step 175. The phase period is calculated by determining the difference between the last value of an on chip timer and the current value of the timer. The calculation includes averaging the three most recent phase periods. After calculating the phase period, the value is checked to determine if it is within an allowable range. If it is not, then an AC phase timing error is set in the status data as discussed above.

After calculating the phase period, the time for activating the gates of the thyristors 65 via gate drivers 90 (FIG. 1) is calculated in step 180. The scheduling of gate firing performed in step 180 and is performed in conjunction with the timer interrupt processing shown in FIG. 5 and discussed below. The step 180 obtains the most recent firing angle calculated in the timing interrupt processing (FIG. 5) and determines the proper one-chip timer value for firing of a thyristor 65 in the next phase. More particularly, in a preferred embodiment step 180 schedules two events (1) the turning off of the previous drive signal (i.e., gate fire output) and (2) the turning on of the next drive signal (i.e., gate fire output). The next drive signal should be turned on simultaneously with the previous drive signal being turned off. If the drive signal in the next phase is not to be turned on, then the previous phase should be scheduled to be turned off as the next event. There are a variety of techniques for activating gate fire outputs such as those applied to gate drivers 90 shown in FIG. 1. Any of the available techniques can be employed with the present invention.

After scheduling the turn on and turn off times of the appropriate drive signals, a return from interrupt is executed in step 185 so that the current controller 35 resumes processing of the main program shown in FIG. 3.

The timer interrupt processing illustrated in FIG. 5 is executed each time an on chip timer times out. Upon being interrupted by the on chip timer, a step 190 is performed to schedule the next timer interrupt. The next timer interrupt is scheduled by using the phase period calculated in step 175 (FIG. 4), and dividing this step by four. The result is added to the current value of the on chip timer and stored in the timer used to schedule the timer interrupt. Thus, the timer interrupts occur at 12 times the line frequency of the AC power being controlled.

After scheduling the next timer interrupt, processing proceeds to step 195 wherein each of the analog inputs to the current controller 35 is sampled and converted to digital form. These analog inputs include the DC line voltage, the DC coil voltage, the DC coil currents and are input indicating the temperature of the cabinet in which the current controller is housed. In a preferred embodiment of the present invention, each DC coil current is averaged, and the average value checked against each DC coil current for a permissible deviation amount. The permissible deviation amount is received by the current controller 35 from the master controller 25 when the parameters of the current controller 35 are initialized as discussed above.

After converting each of the analog inputs and processing these inputs by, for example, averaging and checking the converted input against a permissible limit, processing proceeds to the control algorithm performed in step 200. Any proportional and integral (PI) or proportion, integral and derivative (PID) control algorithm can be employed. PI and PID control algorithms are well known to those skilled in the art, and any control algorithm can be employed with the present invention. In a preferred embodiment of the present invention, the average coil currents read in step 195 are applied to a first order filter. The current set point is determined based upon the parameters received from the master controller 25. Based upon the average coil current and the current set point, a preferred embodiment employs a proportional plus integral control algorithm to determine the phase firing angle which is used by the schedule gate fire step 180 in the phase cross interrupt processing shown in FIG. 4 and discussed above. This algorithm uses gains provided by the master controller 25 via the communication controller 20. The control algorithm also checks the DC coil current against the set point to determine if the absolute error exceeds a permissible range. If the error is greater than the permissible range for a given number of executions of the control algorithm, then the status data current regulation fault bit is set.

After executing the control algorithm and error checking step 200, processing proceeds to step 205 to determine if there is a phase fault. The phase fault detection step 205 determines if there is excessive deviation of any component of the three phase rectified coil voltage. Specifically, the DC coil voltage on DC coil voltage line 70, which was sampled in the A/D conversion step 195, is subjected to any known digital filtering technique to produce an average DC component. If the resulting DC component is determined to be out of range, then a AC phase missing error is detected. Such an error occurs when, for example, one of three phases provided by the Three Phase AC supply 50 is missing or has a significantly reduced magnitude. After completing the phase fault detection step 205, processing returns from the interrupt processing to the main program processing shown in FIG. 3 via step 210.

As seen from the above, the present invention provides a current regulator system that is capable of regulating in accordance the actual characteristics of a system via externally programmable control gains and is adaptable to the phase period of the AC supply. While the present invention has been described with respect to a specific example, the example is not intended to limit the present invention, which instead is defined by the following claims.

We claim:

1. An adaptable current regulating system having a status, said system being connectable to receive a supply voltage, and providing a controlled current to a drive control element in accordance with information from a master controller, said system comprising:
   communication means for receiving the information, for receiving a first portion of status data and for transmitting the first portion of the status data to the master controller;
   control means for monitoring the status and providing the first portion of the status data, for monitoring the received supply voltage, and for generating at least one drive signal varying in accordance with at least some of the information and the monitored supply voltage; and
   fault means for monitoring said at least one drive signal and the received supply voltage and for providing a second portion of the status data in response to monitoring the at least one drive signal and the received supply voltage.

2. An adaptable current regulating system according to claim 1, further comprising:
   means for receiving an insurance supply voltage, and wherein said fault means includes means for providing the insurance supply voltage to the drive control element in response to said at least some of the status data provided by said fault means.

3. A current regulating system for regulating the current to at least one coil in accordance with information received from a master controller, and being connectable to receive an AC supply, said system comprising:
   communication means, connectable to the master controller, for receiving the information, for receiving status data and for transmitting the status data to the master controller;
   control means for measuring the phase of the AC supply, for measuring phase crossings of the AC supply, for receiving the information from the communication means, for monitoring the DC voltage across and current through the at least one coil and for providing at least one drive signal in accordance with at least some of the information and the measured phase so as to regulate the DC voltage across the at least one coil;
   switching means for varying the DC voltage across the at least one coil in accordance with the drive signal; and
   fault detector means for monitoring the drive signal, the phase of the AC supply and for generating a current fault signal when a phase of the AC supply passes without generation of the drive signal.

4. A current regulating system according to claim 3, further comprising an insurance supply connected to the at least one coil and to receive the current fault signal so as to provide a voltage to the at least one coil in response to the current fault signal.

* * * * *